United States Patent [19]
Reddy et al.

[11] Patent Number: 5,928,691
[45] Date of Patent: Jul. 27, 1999

[54] CALCIUM COMPLEX AND A PROCESS OF MAKING A FOOD FORTIFIED WITH CALCIUM

[75] Inventors: Sekhar Reddy, New Milford, Conn.; Alexander Sher, Rockwell, Md.; Dharam Van Vadehra, New Milford; Elaine Regina Wedral, Sherman, both of Conn.

[73] Assignee: Nestec S.A., Vevey, Switzerland

[21] Appl. No.: 08/842,472

[22] Filed: May 1, 1997

[51] Int. Cl.$^6$ ........................................ A23L 1/304
[52] U.S. Cl. ........................ 426/74; 426/573; 426/575; 426/580; 426/599
[58] Field of Search .............................. 426/74, 575, 573, 426/594, 580

[56] References Cited

U.S. PATENT DOCUMENTS

| | | | |
|---|---|---|---|
| 2,594,439 | 4/1952 | Baker et al. | 426/577 |
| 2,871,123 | 1/1959 | Bauer et al. | 99/54 |
| 4,180,595 | 12/1979 | Lauredan | 426/575 |
| 4,268,533 | 5/1981 | Williams et al. | 426/577 |
| 4,378,380 | 3/1983 | Scarpellino et al. | 426/533 |
| 4,438,147 | 3/1984 | Hedrick, Jr. | 426/570 |
| 4,701,329 | 10/1987 | Nelson et al. | 426/74 |
| 4,722,847 | 2/1988 | Heckert | 426/74 |
| 4,746,527 | 5/1988 | Kuypers | 426/569 |
| 4,748,040 | 5/1988 | Kuypers | 426/569 |
| 4,834,990 | 5/1989 | Amer | 426/74 |
| 4,840,614 | 6/1989 | Harada et al. | 426/580 |
| 4,851,243 | 7/1989 | Andersen et al. | 426/74 |
| 4,871,554 | 10/1989 | Kalala et al. | 426/74 |
| 4,919,963 | 4/1990 | Heckert | 426/599 |
| 5,284,674 | 2/1994 | Fazio | 426/580 |
| 5,462,759 | 10/1995 | Westerbeed et al. | 426/568 |
| 5,550,232 | 8/1996 | Keating | 426/74 |
| 5,609,897 | 3/1997 | Chandler et al. | 426/73 |

FOREIGN PATENT DOCUMENTS

| | | |
|---|---|---|
| 0 154 192 | 2/1985 | European Pat. Off. . |
| 0 579 328 | 7/1993 | European Pat. Off. . |
| 4111040 | 4/1991 | Germany . |
| 359162847 | 9/1984 | Japan . |
| 436166 | 2/1992 | Japan . |
| 5-238940 | 9/1993 | Japan . |
| 8-56567 | 3/1996 | Japan . |
| 2 301 015 | 6/1996 | United Kingdom . |

OTHER PUBLICATIONS

Guamis–Lopez, et al. "Calcium Enrichment of Skimmed Milk given UHT Treatment", Alimentaria No. 271, pp. 79–82, 1996.

*Primary Examiner*—Helen Pratt
*Attorney, Agent, or Firm*—Pennie & Edmonds LLP

[57] ABSTRACT

A fortified foodstuff containing a fortifying amount of a complex formed by the interaction of a soluble calcium salt and an alkali metal citrate and a process for its preparation by forming the complex and adding the complex to the foodstuff or forming the complex in the foodstuff.

22 Claims, No Drawings

5,928,691

CALCIUM COMPLEX AND A PROCESS OF MAKING A FOOD FORTIFIED WITH CALCIUM

FIELD OF THE INVENTION

The present invention relates to the fortification of food and more particularly to the fortification of food with calcium.

BACKGROUND OF THE INVENTION

Calcium is an important element in human diets for adequate bone formation and maintenance as well as other metabolic functions, e.g. nerve transmission, blood clotting, proper cell function and muscle contraction. It is common practice to fortify food products with calcium sources which are either insoluble or soluble at around neutral pH. Many of the calcium sources currently used for fortification which are insoluble or substantially insoluble at around neutral pH, e.g. calcium carbonate, calcium phosphates, calcium citrate and other organic acid salts of calcium, result in precipitation and a chalky mouth feel. Other calcium sources which are soluble or substantially soluble at around neutral pH such as calcium chloride, calcium hydroxide and a few organic acid salts of calcium react with milk proteins resulting in undesirable coagulation and sedimentation.

It is also common practice to stabilize or reduce the sedimentation of the calcium and milk proteins in the milk beverages fortified with calcium sources by adding carrageenans, pectins and/or other gums, but such materials impart an undesirably high viscosity to milk. Protein destabilisation, e.g. precipitation and coagulation, is mainly attributed to the amount of free calcium ions in the system.

It would be highly desirable to have a calcium source to fortify milk beverages and other dairy based products without coagulation and sedimentation, and with improved palatability.

SUMMARY OF THE INVENTION

We have developed a complex formed by the interaction of a soluble calcium salt and an alkali metal citrate, which is capable of fortifying milk beverages and other dairy based products without coagulation and sedimentation, and with improved palatability.

According to the present invention, there is provided a fortified foodstuff comprising a fortifying amount of a complex formed by the interaction of a soluble calcium salt and an alkali metal citrate.

DETAILED DESCRIPTION OF THE INVENTION

The soluble calcium salt should be capable of forming a complex and may be, for instance, calcium gluconate or calcium chloride but is preferably calcium lactate. The alkali metal citrate may be, for instance, sodium citrate or other food-acceptable alkali metal citrate but is preferably potassium citrate.

The foodstuff may be a dairy based product such as a milk beverage, a confectionery product, ice cream or another beverage such as a juice.

The amount of the complex present in the fortified foodstuff may be from about 0.05 to 5%, preferably from 0.1 to 2.5%, and more preferably from 0.2 to 1.3% by weight based on the weight of the foodstuff.

The alkali metal should be food acceptable and is preferably potassium.

The weight ratio of the soluble calcium salt to the alkali metal citrate may be from about 1:4 to 4:1, preferably from 1:2 to 3:1 and especially from 1:1.5 to 2.5:1.

The complex may be obtained by forming aqueous solutions or dispersions of each ingredient and mixing them at ambient temperature, e.g. from about 15° to 35° C., preferably from 20° to 30° C. They are preferably mixed until they form a clear solution, for instance over a period of from about 5 to 45 minutes. The complex may be added to the foodstuff, e.g. milk, sauces, pastas.

Although not wishing to be bound by theory, we believe that the complex formed by the interaction of calcium lactate and an alkali metal citrate is either a calcium lactate-citrate complex or a calcium-citrate-lactate complex which may be metastable.

If desired, a source of glucuronic acid may be present to stabilize the complex. The source of glucuronic acid may be gum ghatti but is preferably gum arabic. The amount of gum arabic present in the fortified foodstuff may be from about 0.05 to 2.5%, preferably from 0.1 to 1.0%, and more preferably from 0.2 to 0.5% by weight based on the weight of the foodstuff. Although not wishing to be bound by theory, we believe that the glucuronic acid residues in gum arabic aid in suspending calcium by ionic binding without contributing significantly to viscosity.

Advantageously, a carrageenan may be present which may be the lambda- or iota-form but is preferably kappa-carrageenan. The amount of carrageenan present in the fortified foodstuff may be from about 0.005 to 0.1%, preferably from 0.1 to 0.05%, and more preferably from 0.01 to 0.02% by weight based on the weight of the foodstuff. When the weight ratio of the soluble calcium salt to the alkali metal citrate is below 1:1, carrageenan may contribute instability to milk beverages during the heat processing and to overcome this, a source of glucuronic acid is preferably also present in addition to the carrageenan when milk is the fortified food..

The fortified foodstuff comprising a fortifying amount of a complex formed by the interaction of a soluble calcium salt and an alkali metal citrate may be prepared by forming a complex and adding the complex to the foodstuff.

When a source of glucuronic acid is present, it may be added to the foodstuff in dry form such as a dry powder or it may be dissolved or dispersed in water and added to the foodstuff as an aqueous solution or suspension. If desired, a blend of the complex and the source of glucuronic acid may be added to the foodstuff in the form of aqueous solutions or suspensions or as dry powders.

Advantageously, a carrageenan may be added to the foodstuff, preferably before the complex is added to the foodstuff. The carrageenan may also be added to the foodstuff in the form of an aqueous solution or suspension or as a dry powder.

If desired, the complex, the source of glucuronic acid, and optionally the carrageenan, may be co-dried and added as a powder. The drying may be carried out by various methods known to those skilled in the art.

Instead of forming the complex first and then adding it to the foodstuff, the ingredients of the complex (the calcium salt and the alkali metal citrate) may be added to a liquid food product, e.g. milk or a milk beverage, either simultaneously or one after the other where they interact to form the complex. In this embodiment, one or both ingredients may be added in solid form, or as solutions or dispersions to give the fortified foodstuff.

The complex is a new product and the present invention also provides a metastable complex formed by the interaction of a soluble calcium salt and an alkali metal citrate.

EXAMPLES

The following Examples further illustrate the present invention.

Example 1

1) 4.6 g of calcium lactate pentahydrate is dispersed in 42 g of water at 20° C. and 4.6 g of tri potassium citrate is dissolved in 40 g of water at 20° C. The two solutions are combined and mixed for 30 minutes when a clear solution is formed.

2) 0.1 5 g kappa carrageenan is dissolved in 50 g milk and held for 5 minutes at 165° C. and cooled to 20° C.

3) Solution (2) and 4 g of non-fat dry milk are added to 868 g of milk.

4) Solution (1) is added to solution (3) and the pH is adjusted to 6.6 to 7.0.

5) The fortified milk is divided into two portions, one of which is ultrapasteurized and the other sterilized. Both portions are aseptically filled and stored for 6 weeks one portion of each at refrigeration and one portion of each at room temperature. The samples were judged to be stable at refrigeration but there was a slight sedimentation of the samples stored at room temperature. The product flavor was judged by a taste panel of 10 people to be acceptable by monadic test.

Example 2

1) 4.6 g of calcium lactate pentahydrate is dispersed in 42 g of water at 20° C. and 4.6 g of tri potassium citrate is dissolved in 40 g of water at 20° C. The two solutions are combined and mixed for 30 minutes when a clear solution is formed.

2) 2.0 g of gum arabic is dispersed into 35 g of water at 20° C. for 30 minutes.

3) Solutions (1) and (2) are mixed.

4) 0.15 g kappa carrageenan is dissolved in 50 g of milk and held for 5 minutes at 165° C. and cooled to 20° C.

5) 7.4 g of non-fat dry milk is added to 868 g of milk.

6) Solutions (3) to (4) are added to (5) and the pH is adjusted to 6.6 to 7.0

7) The fortified milk is divided into two portions, one of which is ultrapasteurized and the other sterilized. Both portions are aseptically filled and stored for 6 weeks one portion of each at refrigeration and one portion of each at room temperature. All samples were judged to be stable at both refrigeration and room temperature and had less sediment upon centrifugation than the samples of Example 1 indicating better stability. The product flavor was judged by a taste panel of 10 people to be acceptable by monadic test.

Example 3

1) 4.6 g of calcium lactate pentahydrate is dispersed in 42 g of water at 20° C. and 4.6 g of tri potassium citrate is dissolved in 40 g of water at 20° C. The two solutions are combined and mixed for 30 minutes when a clear solution is formed.

2) 2.of gum arabic is dispersed into 35 g of water at 20° C. for 30 minutes.

3) 7.4 g of non-fat dry milk is added to 918 g of milk at 20° C.

4) 0.02 g kappa carrageenan is dissolved in solution (3).

5) Solution (2) is added to (4).

6) Solution (1) is added to (5) and the pH is adjusted to 6.6 to 7.0.

7) The milk is heated to 165° F. and held for 15 seconds.

8) The fortified milk is divided into two portions, one of which is ultrapasteurized and the other sterilized. Both portions are aseptically filled and stored for 4 weeks one portion of each at refrigeration and one portion of each at room temperature. All samples were judged to be stable at both refrigeration and room temperature The product flavor was judged by a taste panel of 10 people to be acceptable by monadic test. The fortified milk can also be pasteurized and stored under refrigeration.

What is claimed is:

1. A metastable complex in the form of a clear solution formed by the interaction of a soluble calcium salt and an alkali metal citrate.

2. A complex according to claim 1 wherein the alkali metal citrate is potassium citrate.

3. A complex according to claim 2 wherein the calcium salt is calcium lactate, the alkali metal citrate is potassium citrate and the complex is a liquid calcium-lactate-citrate or a liquid calcium-citrate-lactate complex.

4. A complex according to claim 1 wherein the weight ratio of the soluble calcium salt to the alkali metal citrate is from about 1:4 to 4:1.

5. A complex according to claim 1 wherein the complex is formed by forming aqueous solutions or dispersions of each ingredient and mixing them for about 5 to 45 minutes at a temperature from about 15° to 35° C.

6. A complex according to claim 1 wherein a source of glucuronic acid is present to stabilize the complex.

7. A complex according to claim 6 wherein the source of glucuronic acid is gum arabic.

8. A complex according to claim 1 wherein a carrageenan is present.

9. A process for preparing a calcium-fortified foodstuff which comprises forming a complex of a soluble calcium salt and an alkali metal citrate as a clear solution and adding a calcium fortifying amount of the complex to the foodstuff.

10. A process according to claim 9 which further comprises adding a source of glucuronic acid to the foodstuff in an amount sufficient to stabilize the complex.

11. A process according to claim 9 wherein the source of glucuronic acid is added as a dry powder or as an aqueous solution or suspension.

12. A process according to claim 9 wherein a blend of the complex and the source of glucuronic acid is added to the foodstuff in the form of aqueous solutions or suspensions or as dry powders.

13. A process according to claim 9 which further comprises adding a carrageenan to the foodstuff.

14. A process according to claim 13 wherein the carrageenan is added to the foodstuff before the complex is added to the foodstuff.

15. A process according to claim 13 wherein the carrageenan is added to the foodstuff in the form of an aqueous solution or suspension or as a dry powder.

16. A process according to claim 13 wherein the complex, the source of glucuronic acid, and optionally the carrageenan, are co-dried and added as a powder.

17. A process according to claim 9 wherein the calcium salt is calcium lactate, the alkali metal citrate is potassium citrate and the complex is a liquid calcium-lactate-citrate or a liquid calcium-citrate-lactate complex.

18. A process for preparing a calcium-fortified foodstuff which comprises adding a soluble calcium salt and an alkali metal citrate to a liquid food for interaction in a manner such that a complex of the soluble calcium salt and alkali metal citrate is formed as a clear solution and is present in a calcium fortifying amount in the liquid food.

19. A process according to claim 18 wherein one or both ingredients is added in solid form, or as solutions or dispersions to give the fortified foodstuff.

20. A process according to claim 18 wherein the calcium salt is calcium lactate, the alkali metal citrate is potassium citrate and the complex is a liquid calcium-lactate-citrate or a liquid calcium-citrate-lactate complex.

21. A complex in the form of a clear solution formed by the interaction of a soluble calcium salt and an alkali metal citrate.

22. A complex according to claim 21 wherein the calcium salt is calcium lactate, the alkali metal citrate is potassium citrate and the complex is a liquid calcium-lactate-citrate or a liquid calcium-citrate-lactate complex.

\* \* \* \* \*

UNITED STATES PATENT AND TRADEMARK OFFICE
CERTIFICATE OF CORRECTION

PATENT NO.   : 5,928,691

DATED        : July 27, 1999

INVENTOR(S)  : Sekhar Reddy
               Alexander Sher
               Dharam Van Vadehra
               Elaine Regina Wedral It is certified that error appears in the above-identified patent and that said Letters Patent is hereby corrected as shown below:

Claim 1 should read as follows:

A soluble calcium salt and an alkali metal citrate metastable complex in the form of a clear solution.

Signed and Sealed this

Seventh Day of December, 1999

Attest:

Q. TODD DICKINSON

*Attesting Officer*                *Acting Commissioner of Patents and Trademarks*